May 6, 1969  C. N. NORTON  3,441,960
BATH SEAT ASSEMBLIES

Filed Sept. 19, 1966  Sheet 1 of 3

Inventor
Clive Nelson Norton
By Wenderoth, Lind & Ponack
attorneys

United States Patent Office 3,441,960
Patented May 6, 1969

3,441,960
BATH SEAT ASSEMBLIES
Clive Nelson Norton, Queen St.,
Wallan, Victoria, Australia
Filed Sept. 19, 1966, Ser. No. 580,467
Claims priority, application Australia, Sept. 28, 1965,
64,586/65
Int. Cl. A47k *3/12*
U.S. Cl. 4—185                                                    2 Claims

ABSTRACT OF THE DISCLOSURE

A bath seat assembly having a seat member which may assume an upper and a lower level. The framework is of U-shape having side members with spaced sleeves oppositely disposed mounted thereon. A pair of U-shaped arms have their end portions coaligned and pivotally mounted in the sleeves. Each of the arms has a central intermediate part disposed substantially parallel to the axes of the sleeves but spaced therefrom by a radial distance substantially equal to the difference between the upper and lower levels. A seat member has a frame pivotally attached to the intermediate parts of the arms so that a pivoting movement of the arms through approximately one right angle moves the seat member through a substantially circular quadrantal arc in a substantially non-rotational manner between the upper and lower levels. The central intermediate part of one of the arms has a lug member bearing against the underside of the seat member so that as the seat frame is moved from said lower to said upper level the forward edge of said seat member is raised relative to the rearward edge of said seat member, and is lowered relative to said rearward edge as said seat frame is lowered from said upper level to said lower level.

---

This invention relates to bath seat assemblies of the kind including a seat member and means for moving the seat member between an uppermost position above the level of the upper edge of a bath and a lowermost position being somewhat above floor level but sufficiently low to afford the user adequate benefit from water filling the bath to a suitable level, the seat member remaining substantially horizontal and being capable, in all positions, of supporting at least part of the weight of the person using it. For the purposes of this specification such an assembly will be referred to as "of the kind indicated." Furthermore, the assembly will be described in its position of use, and directional or orientational terms such as "upper" and "lower" are not, therefore, to be construed as limiting.

In such devices as known and used hitherto, it has generally been considered necessary to raise and lower the patient in a substantially vertical direction and this has usually been done by an hydraulic apparatus. Such devices, however, are generally cumbersome, bulky and expensive and often require maintenance of a specialized nature.

It is an object of this invention to provide a bath seat assembly which is comparatively simple in construction, not readily liable to derangement, and which is capable of being produced at relatively low cost.

According to my invention a bath seat assembly of the kind indicated comprising a framework of substantially U-shape in plan with the side members of the U-formation defining an imaginary horizontal plane at or immediately above said uppermost position, a pair of substantially identical arms each having its end portions coaligned and accommodated in sleeves oppositely disposed on the respective side members to define an axis of rotation or partial rotation of the arm, each arm having a central part disposed substantially parallel to the axis but spaced therefrom by a radius distance substantially equal to the difference between the levels of the uppermost and lowermost positions, the axes of rotation of the respective arms being substantially parallel, the seat member having associated therewith a frame pivotally attached to the intermediate portions of the arms such that swinging movement of the arms through approximately one right angle moves the seat member along a substantially circular quadrantal arc and in a substantially non-rotational manner between said uppermost and lowermost positions, the central portion of the forward arm being provided with a lug member bearing against the underside of the seat such that as the seat frame is moved from the lowermost to the uppermost position the forward edge of the seat is raised relatively to the rearward edge, and is lowered relatively to the rearward edge as the seat frame is lowered.

But in order that the invention may be better understood reference will now be made to the accompanying drawings which are to be considered as part of this specification and read herewith. In the drawings.

Figure 1:
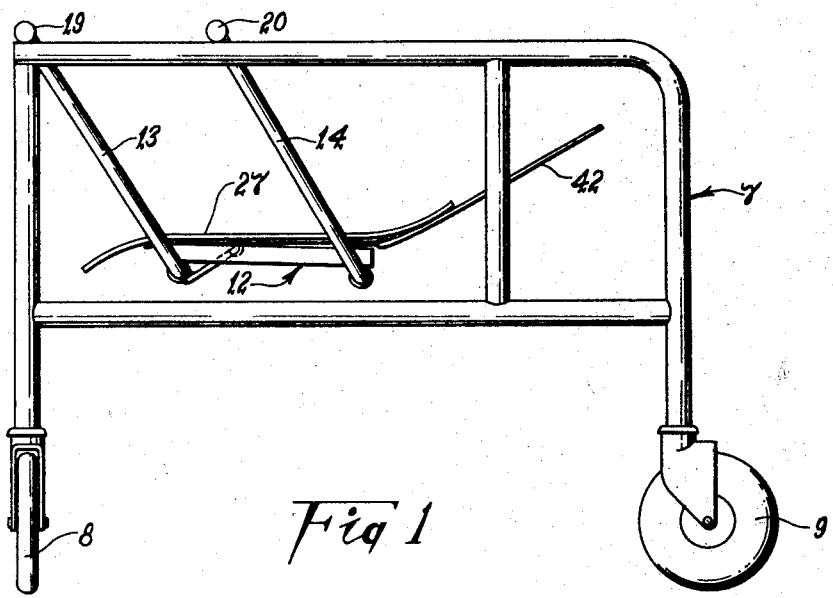
FIGURES 1 and 2 show respectively a side elevation and top plan of a preferred form of bath seat assembly according to my invention.

Referring to the drawings, therefore, the bath seat assembly illustrated therein comprises a trolley framework indicated generally by 7 and movable on forward and rear caster wheels 8 and 9 respectively. As will be evident from FIGURE 2, frame 7 is of U-shape in plan and has side members 10, 11 defining an imaginary substantially horizontal plane. Members 10 and 11 are so spaced as to be capable of straddling a bath (not shown) in conjunction with which the assembly is to be used, the plane of members 10 and 11 being somewhat higher than the upper edge level of the bath. The arrangement just described enables the assembly to be wheeled up to one end of the bath with side members 10 and 11 extending over and adjacent each side thereof i.e. in the direction of the longitudinal axis of the bath assuming this to be of generally rectangular plan.

The assembly also includes a swingable seat frame 12 (FIGURE 1) and means, which are not shown and with which this invention is not specifically concerned, for moving the seat frame between the uppermost position in which it is approximately in or just below the plane of members 10 and 11, and a lowermost position in which portions 13, 14 of arms 15, 16 respectively are substantially vertical.

The arms 15 and 16 are of substantially identical shape and each has collinear end portions 17, 17' and 18, 18' respectively, accommodated in sleeves 19, 19' and 20, 20' oppositely disposed on the respective side members 10 and 11 to define for each arm an axis of rotation or partial rotation. Each arm has a central or intermediate part 21, 22 disposed substantially parallel to the axis but spaced therefrom by a radius distance substantially equal to the difference between the levels of the uppermost and lowermost positions of the seat frame. The axes of rotation of arms 15, 16 are substantially parallel and it will be evident that the central portions 21, 22 remain substantially horizontal, and both substantially in the same horizontal plane during swinging movement about the axes defined by the sleeves.

Seat frame 12 consists of laterally-spaced parallel fore-and-aft members 23, 24 joined adjacent their ends by transverse elements 25, 26 so as to make up a substantially rectangular framework. Attached to this framework is seat member 27 of which the rear end portion is secured by screws 28, 29. This connection is not rigid but is such as to allow a slight relative rotational movement, about an axis defined by the line of the screws 28, 29, between seat 27 and frame 12. This movement is indicated by a comparison between FIGURES 4 and 5. Seat member 27 may be fitted with a backrest (not shown) and both seat and backrest may be covered with plastic.

Figure 3:
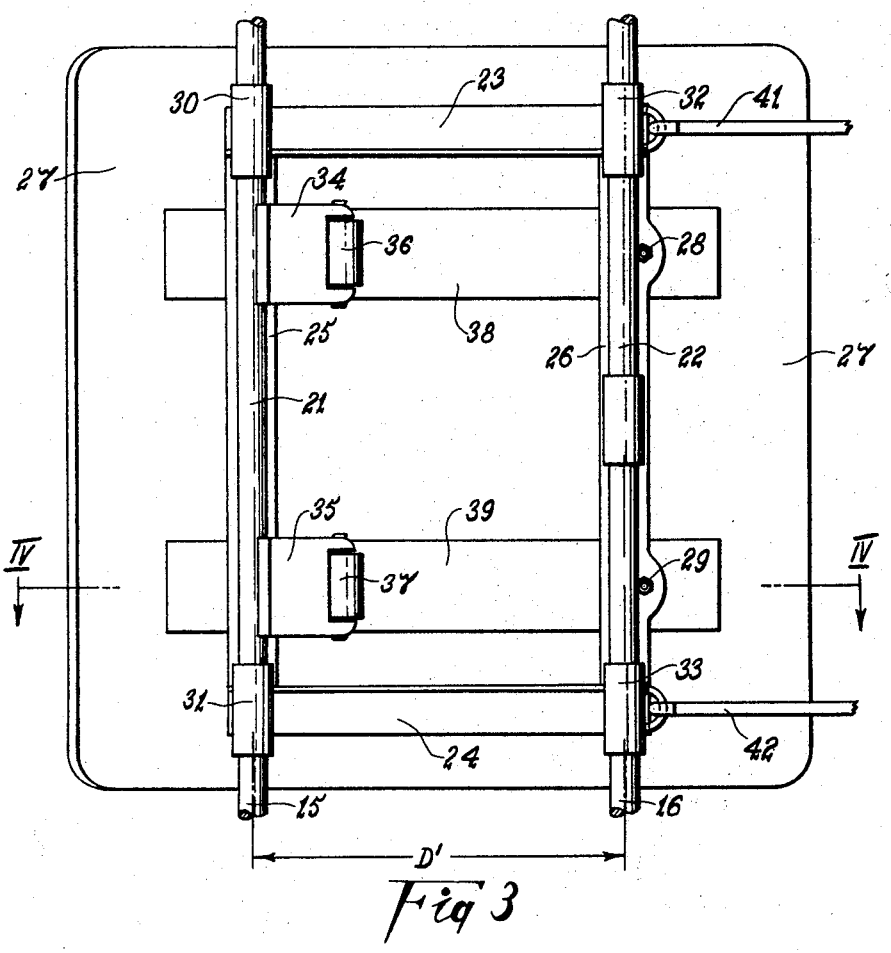
FIGURE 3 shows the underside of a seat frame of the assembly illustrated in FIGURES 1 and 2.
Figure 6:
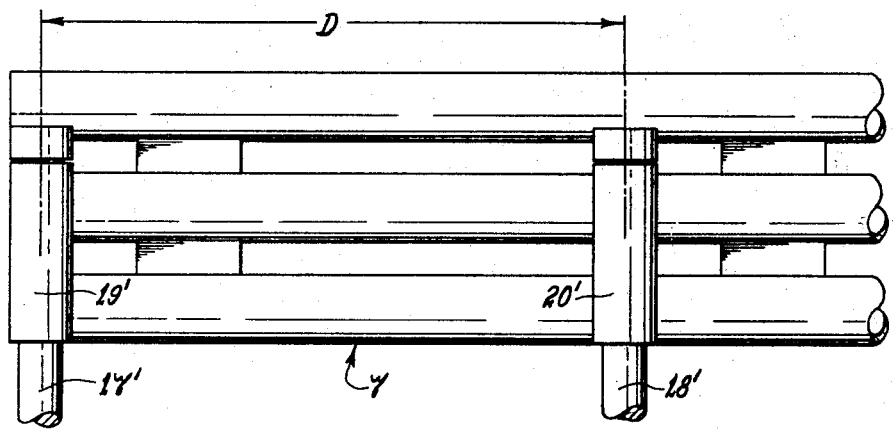
FIGURE 6 is an enlarged view of portion of the plan of FIGURE 2 showing details of the pivots between the swinging arms and frame members of the assembly of FIGURES 1 to 5.

At or adjacent the forward ends of members 23, 24 are coaxial sleeves 30, 31 for receiving the central or intermediate part 21 of forward arm 15. Coaxial sleeves 32, 33 located at or adjacent the rear ends of seat frame members 23, 24 respectively receive the intermediate portion of rear arm 14. It is preferred that the distance D' (FIGURE 3) between the axis of sleeves 30, 31 on the one hand and that of sleeves 32, 33 on the other, be slightly less than the corresponding distance D (FIGURE 6) between the axes of rotation of arms 15, 16 in sleeves 19, 19' and 20, 20' in which the end portions of the arms are received. This slight disparity in distance makes it mechanically possible for the uppermost position of the seat more closely to approach the plane of members 10, 11 than would be the case, for example, if the spacing of the relevant axes were exactly the same.

Figure 4:
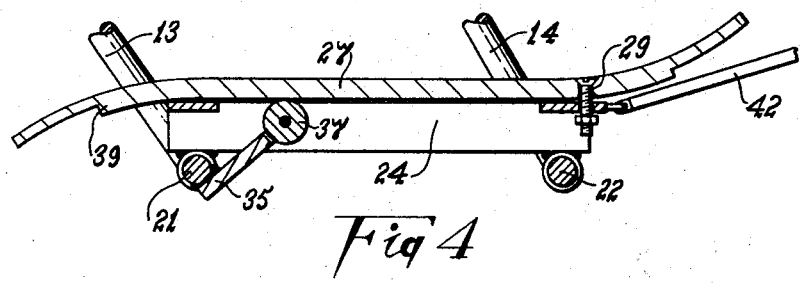
FIGURE 4 is a section across line IV—IV in FIGURE 3 when the seat frame is near its lowermost position.
Figure 5:
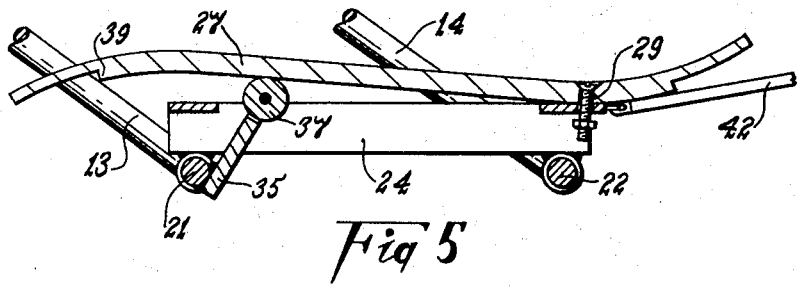
FIGURE 5 is a section similar to that shown in FIGURE 4 with the seat frame near its uppermost position.

Due partly to the fact that these members are not perfectly rigid, it is found that when a weight is applied to the seat framework, it has a tendency to tilt forwardly as it is raised to its uppermost position, thus presenting a risk of precipitating the patient off the seat. To counteract this tendency I provide rigid or substantially rigid association with the straight intermediate part 21 of forward arm 30 a pair of lug members 34, 35 extending upwardly and rearwardly out of the plane of portions 17, 17' and 21. Advantageously the lugs extend at right angles to this plane i.e. substantially tangentially with respect to the swinging movement of the arm. To the outer end of each lug member is pivoted a roller 36, 37 e.g. of brass or plastic adapted to bear on rail portions 38, 39 projecting downwardly from the main body of seat 27. FIGURE 4 shows the seat assembly near the lowermost position and it will be seen that as the seat frame is raised, lug 35 and its associated roller 37 will move towards a vertical position causing roller 37 to push upwardly against rail 39 in such a manner as to tilt seat 27 relative to the seat frame 12. As the seat frame is again lowered, arm 13 and lug 35 will move somewhat clockwise relatively to the seat frame to assume the position shown in FIGURE 4 wherein the seat 27 again drops to its former position in which it rests entirely upon the frame.

It will be appreciated that the tilting is intended only as a counteractive measure, and should not, of course be so great that the patient is made uncomfortable or is given a tendency to slip backwardly.

Although frame 7 has been described only insofar as it comprises a U-shaped member 10, 11, 40 (FIGURE 2), it will be evident that it may also include other supporting members and structure as shown in the drawings. It may be coated with a suitable plastic paint and, if desired, fitted with plastic buffers or fenders to minimize damage to the apparatus itself and to the bath in conjunction with which it is used. Furthermore, the frame may have adjustable members to negotiate baths of different shapes, or the assembly may be provided with different kinds and configurations of non-adjustable frames to suit particular requirements.

It will also be appreciated that the trolley is not an absolutely essential part of my invention, as the seat framework could conceivably be suspended from a fixed structure or a pulley attached to the roof of the bathroom.

Figure 2:
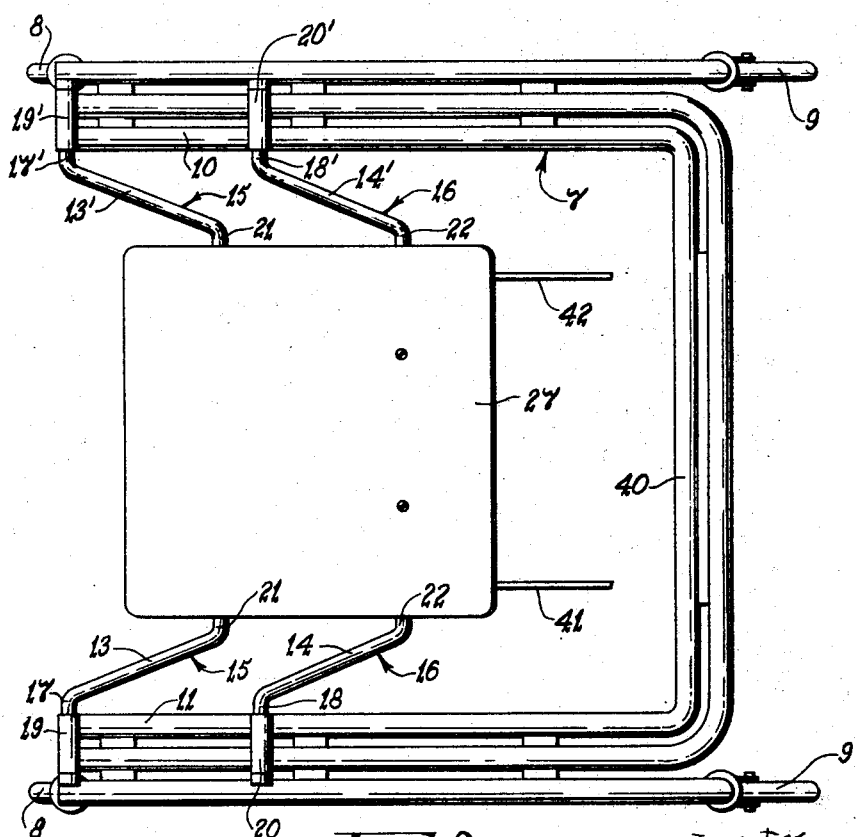

It will also be evident in this regard that arms 15, 16 act in the dual capacity of guiding and supporting means for the seat frame and user. They do not carry the entire weight, at least part of which is communicated to the operating means by cables 41, 42 which may pass around a winch mechanism including a manual crank-operated shaft mounted on member 40 (FIGURE 2). This winch mechanism preferably incorporates a ratchet or other safety device whereby the seat may be held in any desired position.

As shown in the drawings, the pulling arrangement comprising the two segments of cord between the winding shaft and seat framework is advantageously symmetrical about a longitudinal axis to afford a substantially even distribution of tension over the parts involved.

As a possible alternative to the ratchet restraining device referred to above, the crank handle may have an associated slot device attached to the framework of the seat. Normally, spring pressure would retain the member (such as a pin) attached to the handle in engagement with a slot. Disengagement could only be effected by shifting the handle against the spring pressure. In this way, fortuitous or accidental release of the handle would automatically lock the mechanism to prevent sudden releasing of the seat and any accident which may result therefrom.

As an alternative to the winch mechanism, an hydraulic operating mechanism can be used whereby a cable or cables from the seat frame pass over a fixed pulley then around a movable pulley, the cable then being anchored at a fixed point in a plane common with the fixed and movable pulleys. The movable pulley is rotatably mounted on an hydraulic ram or similar device and upon operation of the ram it will be evident that the cables are pulled in or released, the velocity ratio being such that the displacement of the cables is double that of the hydraulic ram or piston.

The operating means may also have associated therewith a safety mechanism such as a Westinghouse-type brake or similar apparatus.

Having now described my invention, what I claim new and desire to secure by Letters Patent is:

1. A bath seat assembly wherein the seat member may assume an upper and a lower level comprising a framework of substantially U-shape having the side members thereof defining an imaginary horizontal plane, spaced sleeves oppositely disposed mounted on said side members, a pair of substantially U-shaped arms, each of said arms having its end portions coaligned and pivotally mounted in said oppositely disposed sleeves, each of said arms having a central intermediate part disposed substantially parallel to the axes of said sleeves but spaced therefrom by a radial distance substantially equal to the difference between said upper and lower levels, the pivoting axes of said arms being substantially parallel, a seat member comprising a frame pivotally attached to said intermediate parts of said arms so that pivoting movement of said arms through approximately one right angle moves said seat member through a substantially circular quadrantal arc in a substantially non-rotational manner between said upper and lower levels, said central intermediate part of one of said arms having a lug member bearing against the underside of said seat member so that as said seat frame is moved from said lower to said upper level the forward edge of said seat member is raised relative to the rearward edge of said seat member, and is lowered relative to said rearward edge as said seat frame is lowered from said upper level to said lower level.

2. A bath seat assembly as claimed in claim 1 wherein the distance between the intermediate parts of said arms is less than the distance between the pivoting axes of said arms.

References Cited

UNITED STATES PATENTS

| 2,788,055 | 4/1957 | Tungs | 4—185 |
| 3,203,009 | 8/1965 | Lundberg | 4—185 X |

FOREIGN PATENTS

| 56,814 | 1/1923 | Switzerland. |

PATRICK D. LAWSON, *Primary Examiner.*